US 6,614,352 B2

(12) United States Patent
Pellet et al.

(10) Patent No.: US 6,614,352 B2
(45) Date of Patent: Sep. 2, 2003

(54) ACCURATE STEPMETER FOR LOCATION-BASED SERVICES

(75) Inventors: Yannick Pellet, Dallas, TX (US); Dominik Jaworek, Coppell, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/999,105

(22) Filed: Oct. 31, 2001

(65) Prior Publication Data

US 2003/0080869 A1 May 1, 2003

(51) Int. Cl.[7] ............................................... G08B 23/00
(52) U.S. Cl. ................. 340/573.1; 340/539.1; 702/160
(58) Field of Search ..................... 340/573.1, 545.1, 340/566, 323 R, 539; 702/145, 160

(56) References Cited

U.S. PATENT DOCUMENTS

| 4,371,945 A | * | 2/1983 | Karr et al. .................. 364/561 |
| 4,651,446 A | * | 3/1987 | Yukawa et al. ................ 36/132 |
| 5,524,637 A | * | 6/1996 | Erickson ..................... 128/779 |
| 5,899,963 A | * | 5/1999 | Hutchings .................... 702/145 |
| 6,052,654 A | * | 4/2000 | Gaudet et al. ............... 702/160 |
| 6,298,314 B1 | * | 10/2001 | Blackadar et al. ........... 702/178 |
| 6,323,807 B1 | * | 11/2001 | Golding et al. ............. 342/419 |

* cited by examiner

Primary Examiner—Benjamin C. Lee
Assistant Examiner—Phung Nguyen

(57) ABSTRACT

A system and method for determining the progress and position of a pedestrian. The shoes of the user are each provided with communicating sensors. The sensors sense when a step has been taken and communicate with each other through Bluetooth, 802.11b, or some other such short-range wireless protocol. This communication includes a distance measurement, and the distance between sensors is calculated and stored with each step, the sensors being in communication with a central processor for this purpose. The sensors also determine their own orientation and their orientation relative to the other sensor, communicating this directional information to the central processor as well. The direction information is used to calculate the direction of travel and, combined with the accumulated distance measurements, the position of a user.

23 Claims, 4 Drawing Sheets

ACCURATE STEPMETER FOR LOCATION-BASED SERVICES

The present invention relates generally to distance and position determination systems, and more specifically to a system and method for accurately estimating the position of a locomoting individual relative to a fixed benchmark or starting point.

BACKGROUND OF THE INVENTION

Position (or location) determination has become much more accurate in recent times. In years past, travelers developed various navigation techniques that involved determination of position according to landmarks and the individual's position in relation to them. The success of this system, of course, depended on the availability of recognizable landmarks and the observer's familiarity with them, either through an adequate description presented orally or in a written document. The landmarks could be natural or constructed, fixed or temporary, these factors varying according to the level of reliability required and the availability and cost of landmarks more reliable.

The sun and moon served as landmarks of sorts, although some knowledge of their (apparent) movement was necessary for accurate reckoning. When visible, the stars of the night sky provided an even more valuable landmark, although to make proper use of them required instruments for accurately gauging their position and charts applicable to varying locations and times of year were generally required. Despite these limitations, the stars provided a relatively reliable means of navigation where no (other) recognizable landmarks were available, for example at sea.

Compasses provided a great aid to position determination as well when reliable maps became available. Although almost unfailing accurate in determining direction, absent magnetic disturbances, a compass does little to aid in the determination of position absent one of two methods. The first of these methods involves, again, recognizable landmarks. Using a reasonably accurate map, position can be determined by reading the direction to a plurality of visible and mapped landmarks, finding one's position at or near the intersection of the various directional lines. For example, if a city shown on the map lies due East, and a mapped mounted peak due North, the individual's mapped position is at the intersection of lines drawn from the city extending west and from the mountain extending south. Additional landmarks help confirm the location and determine it more accurately. Depending on the quality of the map, compass, and landmarks, this method could be extremely accurate. Absent any of these factors, of course, the method could be extremely inaccurate.

The second method of compass reckoning is for the individual to proceed from a known reference point in a certain direction as determined by following the compass. If this course is followed diligently and accurately, then the individual will know their position lies along the line radiating from the reference point in the pre-established direction. This may be sufficient in itself, but often it will be desirable to determine a position point on this radiating line itself. For this, the rate of travel must be accurately measured in some way. Several methods are available. The individual could simply count paces and multiply by the length of one (presumably average) pace. If the individual is not walking, another method could be used, such as estimating a rate of travel and measuring the time in transit. Obviously, the journey could be subdivided to account for different pace lengths or rates of travel, to the extent that they can be determined. The distance could be directly measured, of course, for example by using a marked tape or wheel, although this may prove inconvenient over long distances. And any of these methods are compounded by changes in grade or obstacles, which may force the pace length or rate of travel to change, or make it difficult to use distance-measuring devices accurately. The same obstacles also make it difficult to stay true to the predetermined course and, therefore, further compounds the reckoning process even when reasonably accurate distance measurement is possible.

Despite their shortcomings, the various methods described above were widely used for many years, and not without some refinement. The advent of the Global Positioning System (GPS), however, advanced the art of position determination by a considerable degree. GPS uses signals sent from a plurality of satellites to allow an Earth-based instrument to determine its own location. Using such an instrument, an individual may determine their position almost anywhere on the Earth to an accuracy of several meters. And although a properly-calibrated instrument is required, the individual need possess no accurate knowledge of their own starting point or how far they have traveled from it.

A GPS, however, used for the navigation of ships and planes or for locating hikers lost in a wilderness area, cannot provide the precision of location necessary for successful information in some areas. In particular, where determination of a location within a building is concerned, the level of precision available is not sufficient. Yet position determination may be desirable for the provision, for example, of location-based services (LBS). LBS involves not finding an airport or a lost person, but rather the presentation of information, for example to a store patron, that is pertinent to the exact merchandise display next to them. Or, if a blind person is attempting to navigate through an office building or city market, the approximate location is already known. Far more precise location information is needed. In such a situation, of course, the fact that quite accurate location could be determined from landmarks is of little consequence.

There remains a need for a position location system that can both achieve a high degree of precision and be used by a person who is neither highly trained in using sophisticated instrumentation or predisposed to pay attention to the degree required to use them correctly.

SUMMARY OF THE INVENTION

In one aspect, the present invention is a system including a first short-range radio step sensor placed proximate to one foot of a pedestrian, and a second short-range radio step sensor placed proximate the other. Each sensor can detect when footfall has occurred, indicating another step has been taken, and initiating the collection of progress information. The system further included a processor coupled to a memory data-storage device for receiving and storing the progress information, both as received and in cumulative form. The system may further include an electronic compass for determining sensor orientation. Where an electronic compass is used in this manner, a learning program may be employed so that more accurate use of the progress information may be made based on the pedestrian's walking-style habits as observed on a test path.

In another aspect, the present invention is a method of progress determination including the steps of providing a first and second radio step sensor, one placed proximate to each foot of the pedestrian. The system is initialized, and when a footfall is detected, progress information is collected and stored. The stored information is used to arrive at a cumulative position change with reference to the starting point. The progress information may include either the distance traveled or the direction of travel, or both. Where positional information is used, the method may further include the step of comparing the pedestrian's cumulative progress to a stored map, and providing instructions for future travel.

BRIEF DESCRIPTION OF THE DRAWINGS

For a more complete understanding of the present invention, and the advantages thereof, reference is made to the following drawings in the detailed description below.

DETAILED DESCRIPTION

FIGS. 1 through 4, discussed below, and the various embodiments used to describe the present invention are by way of illustration only, and should not be construed to limit the scope of the invention. Those skilled in the art will understand the principles of the present invention may be implemented in any suitable device attached to a pedestrian, human or otherwise, in addition to the devices specifically discussed herein.

Figure 1:
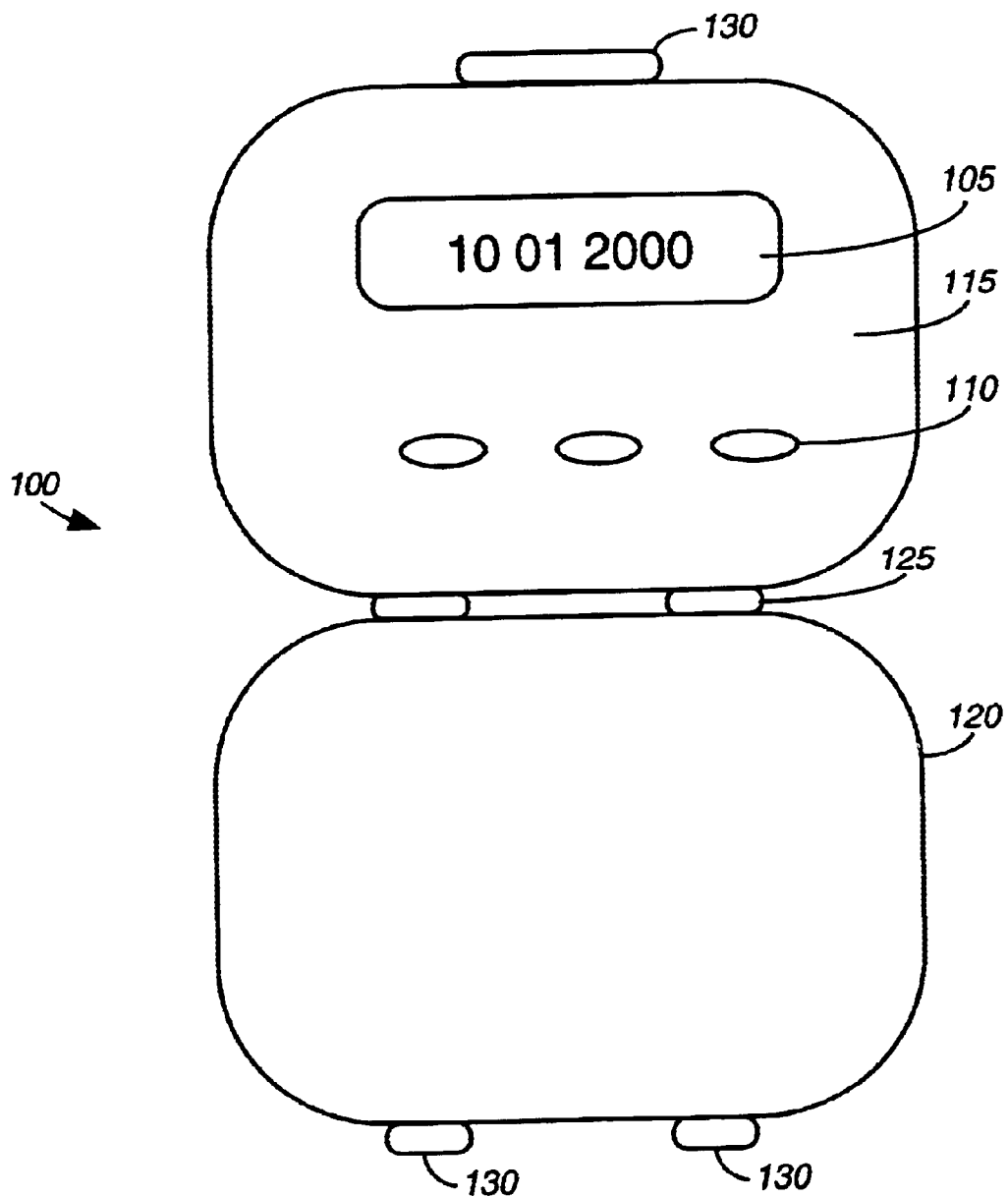
FIG. 1 is an illustration of an electronic step meter distance-measuring device of the prior art.

FIG. 1 is an illustration of an electronic step meter distance-measuring device 100 of the prior art. The step meter is designed to be worn by a user that is a pedestrian. Typically, it is attached to some other article of clothing in the area proximate the user's pelvis. The step meter operates by sensing the user's body movement in order to make a count of the number of steps the user takes to walk from one place to another. The cumulative number of steps counted is displayed on digital readout 105. Step meters can be used by hiking enthusiasts or athletes-in-training to track the amount of exercise that has been performed. Calculating circuitry (not shown) within the step meter 100 allows the device to keep track of the number of steps achieved during a certain walking segment as well as the cumulative steps taken over a number of segments. Keypad 110 on the face 115 of step meter 100 provides a user interface through which the user can indicate when a particular segment starts and stops. Keypad 110 also allow the user to control what is being displayed on digital readout 105, for example to switch back and forth between the total steps for the current segment, for a previous segment, or for a cumulative total. Keypad 110 and digital readout 105 are protected, when not in use, by cover 120, which pivots about hinge 125 to cover face 115 of step meter 100. Cover 120 is retained in this closed position by interlocking retaining tabs 130.

The step meter 100 is also capable of using the length of a user's stride to calculate the actual linear distance traveled. For example a user with a 0.85-meter stride that takes 1000 steps has traversed a distance of 850 meters. The stride length naturally varies from person to person and therefore will need to be entered by each individual user, again using keys 110. Presuming sufficient memory within the step meter 100, the stride length for a number of different individuals could be entered and saved for future use. Each user of the device need in this case only enter stride length information once, and thereafter simply provide some form of identification so that the step meter 100 uses the proper basis for calculation. Of course, even a particular walker's stride may vary depending on factors such as weather, terrain, and level of exertion. A single user may also make use of the variable-stride-length utility to indicate when one of these factors has changed, causing the distance calculation to be modified accordingly. Just as with the number of steps, step meter 100 can keep track of the distance covered in a particular trip segment, and the cumulative distance traveled over a certain number of segments as well.

Stride length may be ascertained by simple measurement, or calculated from the number of steps required to traverse a known distance. For example, if 85 steps are taken over a carefully-measured distance of 100 meters, the stride length is 0.85 meters. Of course, this is the average stride length, as there may be some natural variation from step to step. Still the variation should be relatively small and self-canceling. That is, some strides being slightly longer than average and others slightly shorter, over many steps the stride length should still center about the average, all other factors remaining constant. Obviously, greater accuracy will be achieved where the stride length is measured under conditions approximating those that the user expects to encounter when suing step meter 100 to actually measure distances. For example, a walker that exercises on level city street might accurately determine stride length at a running track by counting the number of steps taken to cover a measured kilometer. The same stride length would not be as accurate, however, if the walker entered an area with steep hill or footpaths offering uncertain footing. If that type of terrain is expected, stride length determination should be made accordingly. A number of separate stride-length determination could be made if excursions into varying terrain are planned, with the appropriate value be entered into step meter 100 when a change is encountered.

Distance measurement can be very useful for athletes trying to maintain a definite schedule of exercise. Especially for those covering great distances, performing their entire regimen on a flat running track would be monotonous. Armed with a step meter, however, the person could simply begin walking (or running), and turn back when their step meter indicates they had half-covered the planned distance. Hikers also benefit by knowing the distance they have traveled if they are following a map into an unknown area. For example, assuming the proper stride determination has been made, they can begin looking for a mapped trail when the step meter tells them they have made the nearly distance to it, as indicated on the map. In this way, the step meter can be used to determine a hiker's location as well as (or more properly, as a result of) calculating the distance thy have traveled.

Problems with accuracy of the distance measured may affect the usefulness of step meter 100 as a location-determining device. As mentioned above, the accuracy of the step meter is a function of properly entered stride length. Although some correction can be made by entering different stride lengths for use by the calculator when terrain changes, this measure in itself provides no guarantee of accuracy. For one thing, absent a test track identical to the encountered terrain, the stride length calculation is only an approximation. And there is a practical limit to the number of different test-track determinations that can be made, as well as the user's ability to match them to the course at hand. Even worse, if the user forgets to set the step meter 100 to their own stride length (for example, after it was used by another), or to make the proper terrain adjustments, the calculated distance could be off by a fairly large margin. Even where the omission is eventually realized, they presumably have no desire to return to their starting point and begin again using the proper values. Here the law of averages will be of less assistance; any attempt to compensate for a too-long stride length by using for a time a too-short one will probably not be successful in practice.

Even absent such a mistake, of course, the stride-length distance calculation remains an approximation. Stride length may vary more than expected, and while minor variations may cancel out, more major ones may not. For example, a stride-length determined on a one-kilometer course may be inaccurate for a person attempting to walk ten kilometers a day. Likewise, one very large hill may tire then to the point where the stride-length is measurable altered even though the hill itself accounted for less than ten percent of the total distance traveled. Adverse weather conditions or poor visibility may also affect the accuracy of a stride-length calculation made in good weather. In many situations, step meter 100 may simply not be accurate enough.

Figure 2:
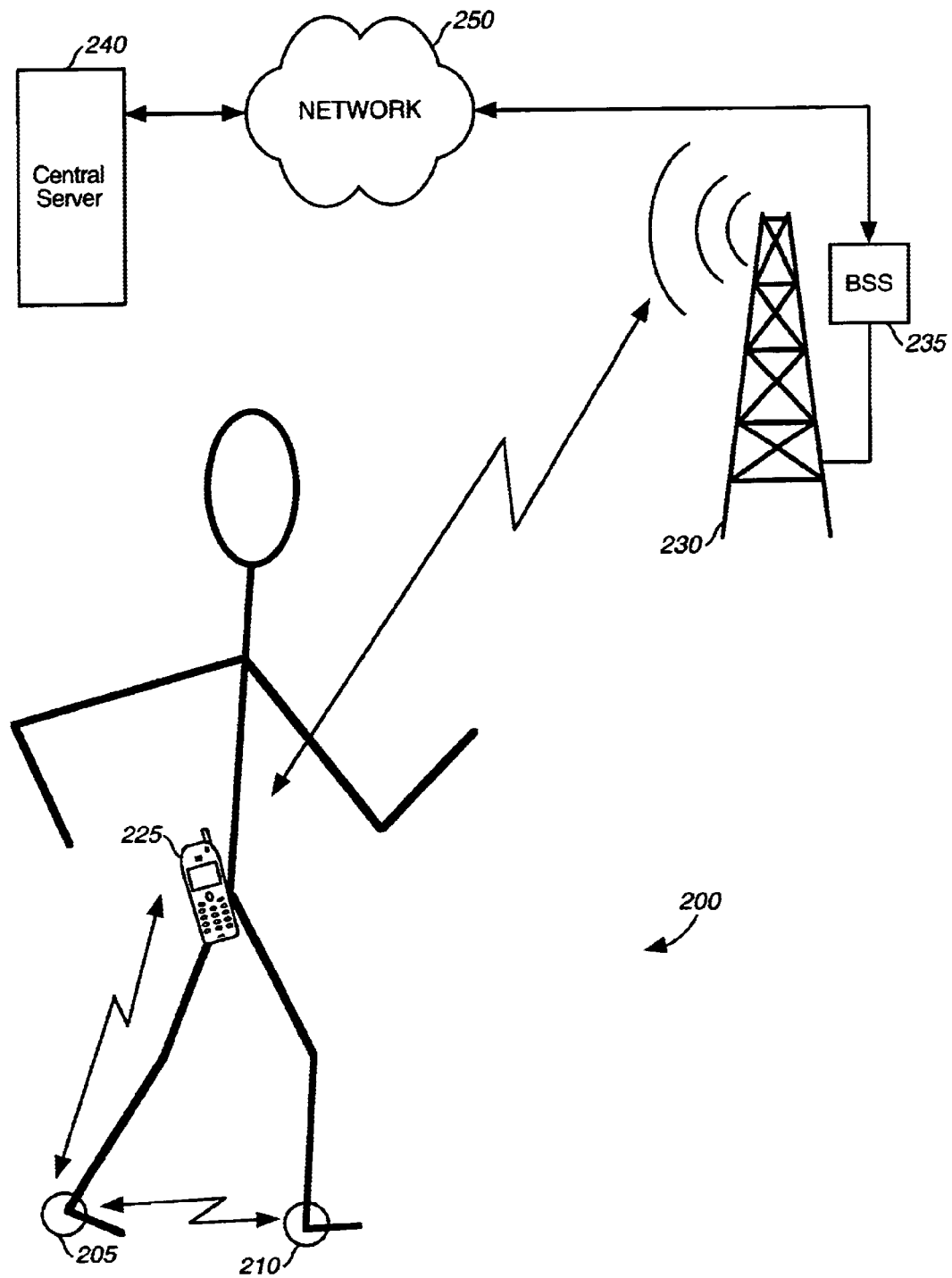
FIG. 2 is an illustration depicting one deployment of an accurate progress measuring system of the present invention.

FIG. 2 is an illustration depicting one deployment of an accurate progress measuring system 200 of the present invention. The user, shown as a stick figure, carries proximate to the heel of each shoe a sensor or group of sensors 205 and 210 (not visible but represented in FIG. 2 by circles to show their preferred location on the user). Sensors 205 and 210 include short-range radio communication devices that communicate with each other via the Bluetooth protocol or some other short-range radio protocol such as IEEE 802.11b. Bluetooth (named after an early Scandinavian King) is a communications protocol developed by a consortium of telecommunications companies for governing short-range radio communication between compatible devices. The expectation of the Bluetooth developers is that the great majority of electronic devices will eventually include this capability. When two (or more) such devices come with in range, typically about 10 meters, they detect each other's presence and begin wireless communication using a standard handshake protocol. This naturally includes an identification sequence so that devices that are supposed to recognize each other may do so. For example, a computer and a printer together determine that the former is attempting to send a document to the latter for printing. They can then exchange the necessary data to accomplish this function.

Although the number of Bluetooth devices is expected to increase dramatically, overly-congested airwaves are not anticipated. The limited range of Bluetooth devices, coupled with a sophisticated frequency-hopping scheme, prevents them from being overwhelmed with communications from a multitude of other Bluetooth devices. Note their limited range is partly due to their low power output, but this also means that power consumption is low—a distinct advantage. Another way that Bluetooth devices may reduce power consumption is by only utilizing for transmission the power necessary to reach a particular device effectively. That is, where two or more devices have detected each other's presence and established the need for actual data transmission, they can reduce the power needed for transmission by measuring the distance separating them and adjusting their output power accordingly. As many Bluetooth devices will operate in relatively close proximity, substantial savings may be realized. The present invention takes advantage of this distance-measuring capability. Again, it is not a requirement that Bluetooth be used; any system that makes distance measurements may be used, as well. In a preferred embodiment, sensors 205 and 210 can also determine the direction from which a signal is being sent, for example by analyzing the strength of a given signal with respect to a variety of directions.

In accordance with the present invention, sensors 205 and 210 use Bluetooth or a similar short-range wireless technology in order to communicate with each other to coordinate operation of the distance and position determination method of the present invention as more fully described below. Sensors 205 and 210 also communicate with mobile station 225. Mobile station 225, shown here as a cellular telephone, contains a mobile system controller (not shown) that receives sensory input from sensors 205 and 210 and makes the calculations necessary for determining distance and position, and for reporting the results in a manner that the user can comprehend. Preferably, mobile station 225 is also capable of communication with a wireless network, in this embodiment through antenna 230, which is connected to base station system (BSS) 235. Note that in a typical mobile environment, there are many such BSSs, each with a range sufficient to cover a limited area. As the user, and therefore mobile station 225, travel from area to area, network communication with mobile station 225 is "handed-off" from one BSS to the next. Through the network, mobile station 225 may communicate the results of its calculations, receive additional information, and access a network server for assistance in executing processing and data storage functions. While the system is most advantageous when most of the functionality is accomplished by user-carried equipment, in some circumstances it may be preferable to have the calculations performed remotely using sensor data transmitted through the network described above. A central network server 240, in communication with BSS 235 through network 250, is available for this purpose.

Figure 3:
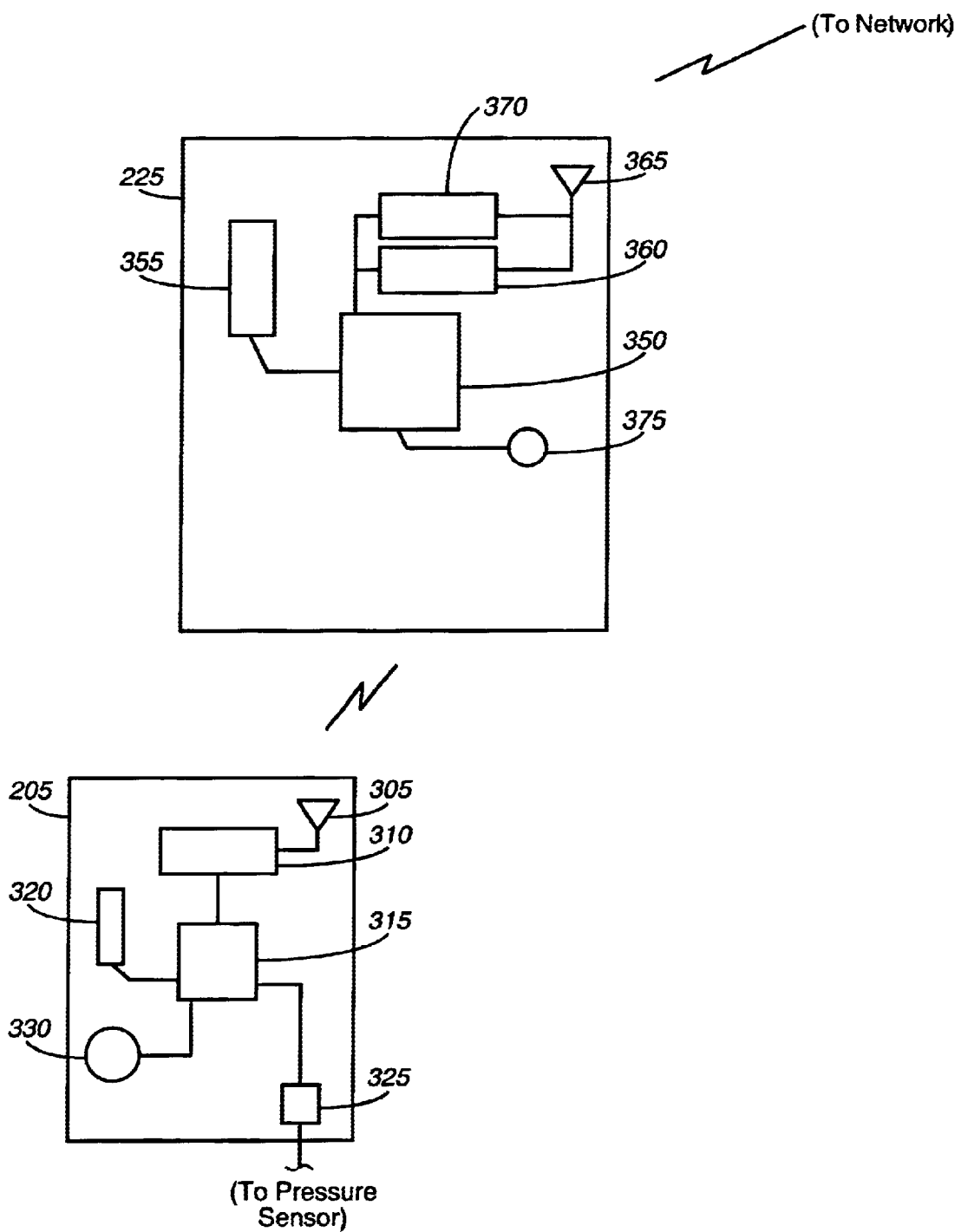
FIG. 3 is a functional block diagram illustrating selected components of sensors (sensor being in this embodiment identical) and mobile station.

FIG. 3 is a functional block diagram illustrating selected components of sensors 205 (sensor 210 being in this embodiment identical) and mobile station 225. Sensor 205 includes an antenna 305 coupled to radio (that is, transmitter and receiver) circuitry 310. Radio circuitry 310 is in communication with microprocessor 315 that locally controls the operation of sensor 205. Microprocessor 315 accesses memory module 320 to retrieve basic instructions and information in working data files. Note that there may be multiple memory devices but, for convenience, only one is shown. Also coupled to microprocessor 315 is pressure-sensor interface 325. The pressure-sensor device itself (not shown) is placed proximate the user's foot, preferably near the heel. In a preferred embodiment, it is actually incorporated into the user's shoe, boot, slipper, or other footwear. When the user takes a step, as indicated by a sensed heel strike, pressure-sensor interface 325 receives the indication from the pressure sensor itself and transmits a signal to microprocessor 315. The user step detection initiates other steps in the process, as will be described below. Sensor 205 also includes electronic compass 330 for determining the direction in which sensor 205 is oriented at any given time. This orientation could be judged in relation to magnetic compass directions, possibly adjusted to conform to "true" directions, or simply a current direction in relation to a reference direction. For the sensor 205 directional orientation to be meaningful, of course, the sensor must be fixed with respect to the user's foot, a requirement easily met by rigidly attaching it to or incorporating it in the user's shoe. Electronic compass is coupled to microprocessor 315 so that directional readings are continuously available. A power source (typically a small battery—not shown) and a voltage regulator will be present to provide power to the various components of sensor 205.

Mobile station 225 also includes a controller 350 having access to memory 355. While certain functions of the system of the present invention may be distributed, note that in a preferred embodiment, the main control for its operation resides in mobile station 225. Although lacking the virtually unlimited computing power of remote central server 240, mobile station need only communicate locally with sensors 205 and 210, and does not for this purpose, depend on being within range of a BSS or being able to establish a radio link to the BSS antenna. For some applications, however, operating in cooperation with central server 240 will be both necessary and desirable. Mobile station 225 includes local radio circuitry 360 for communicating with sensors 205 and 210, through antenna 365. It also includes network radio circuitry 370 for handling calls to the wireless network. A translation module (not shown) may also be present to convert data from the local radio format to network format, if necessary. Note that the separation between the two radio circuitry modules is functional, and a single module may handle both local and network communication if configured appropriately. Mobile station includes clock 375 for use in time-stamping data and timing certain operations as necessary.

Figure 4:
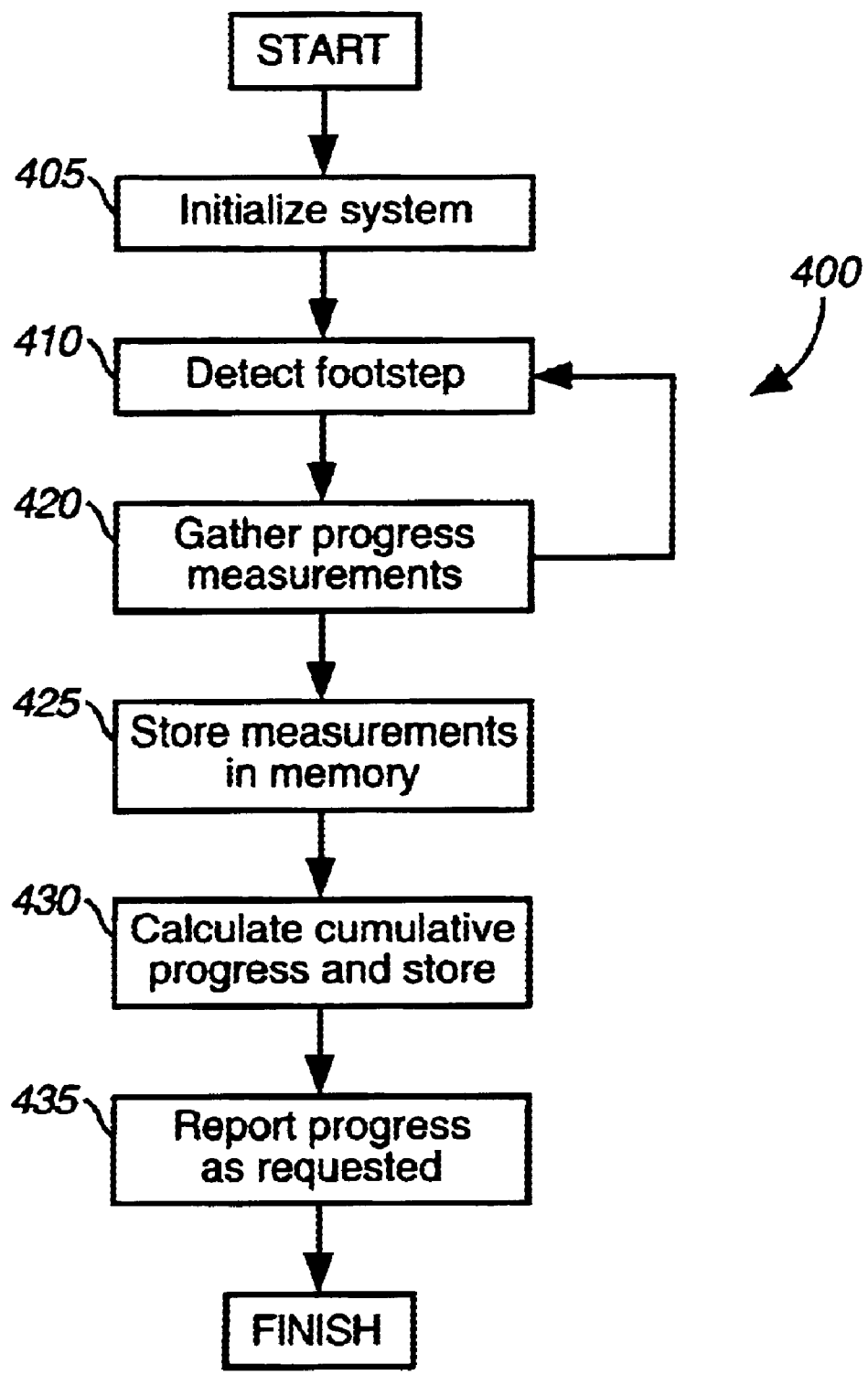
FIG. 4 is a flow chart illustrating a method of distance measurement according to an embodiment of the present invention.

FIG. 4 is a flow chart illustrating a method 400 of progress measurement according to an embodiment of the present invention. Initially, (process step START), it is presumed that the system described above is available and operational. The system of the present invention measures the distance traveled by the user, and preferably position as well. As such, it is preferred that initially the user's location be confirmed definitely. For example, the accurate step meter of the present invention may be used to guide a person through a building, the guidance being either necessary or simply desirable. Necessary guidance may be performed for a person who is sightless, and hence cannot simply "look around" to determine where they should go. The sightless condition may result from the condition of the building rather than the quality of the user's eyesight. A firefighter may have to navigate through a building thick with smoke, or maintenance workers make it through a powerless building with only flashlights. The system and method of the present invention, of course, is a useful supplement even where some or even complete visibility is available as well. And the system may be used by a tourist or shopper to navigate non-hazardous, but nevertheless unfamiliar territory.

It is not necessary, of course, that a definite starting position be established, although any subsequent positional determination will be made relative to the starting location and so the accuracy of the former is related to the accuracy of the latter. For simple distance measurements, of course, the starting and ending location may be of no consequence; the athlete-in-training may care only when they have reached their distance goals. The system, however, is initialized (step 405) in any circumstance. If no definite starting location is ascertained, an arbitrary "starting point" is chosen—the beginning point from which progress will be measured. Note that the term "progress" is used herein to describe the locomotion of the pedestrian at a given point relative to a starting location (definite or arbitrary). Progress may be measured in terms of distance only, or may include a positional component as well. The positional component may be simply a relative direction, for example "due east of the starting location," but may include the path taken to reach the given point as well. Initialization occurs when a signal entered by the pedestrian is received by the system.

After entering the start signal (initializing the system), the pedestrian begins walking. As the first footstep lands, it is detected by the sensor associated with that foot (step 410). When the step is detected, progress measurements are taken (step 420). As mentioned above, certain short-range radio-enabled devices are capable of making distance measurements between themselves, often for the purpose of adjusting their output power. In this instance, however, the distance measurement is used to gauge the distance traveled by the pedestrian in that step. In some cases, only distance measurements will be taken. In a preferred embodiment, however, other measurements or determinations are made, as well. For example, in addition to distance, one sensor may determine the direction from which the signal from the other is being received. In this way, a conclusion can be justified that a footfall detected indicates travel in that direction. The assumption is made, of course, that the step was taken in the direction of travel and that the pedestrian changed position accordingly. As with existing stepmeters, there is no way in this embodiment to determine if the pedestrian is merely "simulating" locomotion, for example by placing one foot in front of the other and repeatedly stamping it on the ground. (Advanced algorithms that analyze the footfall pattern to distinguish those footfalls representing progress from those that don't may be used to minimize this effect.) While it is doubtful that the pedestrian will intentionally try to "fool" the device, there may be situations, such as at a resting stop, they may wish to simply pause the accumulation of progress information. In a preferred embodiment, such a feature is provided. Depending on the accuracy desired, the user may even wish to return to the "pause location" before restarting the system and resuming their journey.

In a preferred embodiment, each sensor is provided with an electronic compass 330 for determining the orientation of the sensors and hence of the feet associated with them. The progress information collected also includes the direction of the traveling foot at footfall, which will provide an indication of the direction of travel by comparing it with a previously measured orientation to determine if the direction of travel is changing. Note that this is a relative measurement and does not rely specifically on the direction in which the user's foot is "pointing". Because it is the change in orientation that is important, other direction indicators may be used, such as a gyroscope or similar instrument.

In yet another embodiment (not shown) of the present invention, the accuracy of the progress information is enhanced through use of a learning program. As the pedestrian traverses a previously laid-out path, the patterns of foot (and thus sensor) orientation are noted and compared to the path layout. The system thereby becomes familiar with how the pedestrian walks through, for example, wide arcs, ninety-degree corners, and hairpin turns. Differences between turning left and turning right can also be noted learned patterns are stored on a database. When in actual use the pedestrian's progress is charted more accurately because the system can refer to the stored patterns to more accurately approximate what maneuvers the pedestrian is executing in the non-test situation. Coincidentally, pedestrians who may need to use the device in an emergency situation themselves can learn on the test path how to restrict themselves as much as possible to their own standard patterns, or how to modify them to enhance the system's accuracy.

Whatever progress information is determined, it is stored on a memory device (step 425). This device may be located near the sensor itself, but for practical reasons is more likely to be on a mobile station in communication with the sensors. The mobile station may itself be in communication with a communicating network through which it may transmit the information to a remote server (step not shown). Of course, there is no requirement that the information be stored or processed in only a single location, and redundant processing may be desirable in some circumstances. When progress information has been recorded, a cumulative result is calculated and stored (step 430). For the first footstep, of course, the cumulative result will be the same as the gathered information, but as steps 410 through 425 are repeated, the cumulative result will reflect the entire trip or segment. Cumulative information may include the total number of steps and the total distance traveled, the latter being summed rather than calculated from stride length as with existing step meters. The total steps may be saved for tracking purposes, or it may be multipled by a stride length to compare the result with the distance total. Where directional information is being gathered, the cumulative result includes a cumulative position change calculated from a combination of distance and directional measurements. The progress is reported (step 435) automatically or as requested by the pedestrian (or by assistant or assisting device).

Using the method of FIG. 4, the accumulated progress information may be used in a variety of applications. It may amount to simply a more accurate stepmeter, for example, one where variable stride length caused by fatigue, terrain, or weather conditions does not affect the accuracy of the result. Progress information involving direction may also provide the location of an endpoint in relation to a starting point. Where no landmarks or benchmarks are available to the pedestrian, this information may be very useful. Positional information may also be applied to determine where along a given path the pedestrian is. Returning to the example of a firefighter in a smoke-filled building, an assistant with a building may receive a location update with each step and be able to provide instructions in return, perhaps through a mobile station being carried by the firefighter. In a preferred embodiment, the instructional system may be automated, with instructions sent to verbally using recorded or synthesized speed or, a prompting device that uses lights positioned within view on the firefighter's hat to signal the need to turn left or right. In yet another embodiment, an audio signal may begin if the firefighter strays from a pre-determined course, growing more intense the further off course the actual travel path becomes. In any event, the automated system will have a database containing a map of the building, and simply use reported progress information to determine the current location. In any such positional system, means may also be provided for adjusting the determined position when an actual landmark is encountered.

The preferred descriptions are of preferred examples for implementing the invention, and the scope of the invention should not necessarily be limited by this description. The scope of the present invention is defined by the following claims.

What is claimed is:

1. A system for determining the progress of a pedestrian relative to a starting point, comprising:
   a first footstep sensor;
   a second footstep sensor in radio communication with the first sensor via a short-range radio link, wherein the sensors are operable according to a short-range radio protocol providing for mutual radio-link length determination; and
   a processor coupled to receive radio-link length information from the first step sensor and the second step sensor to determine progress information.

2. The system of claim 1, wherein the progress information comprises the distance between the first footstep sensor and the second footstep sensor as determined from a radio signal received by at least one of the sensors.

3. The system of claim 1, wherein the progress information comprises the orientation of at least one of the sensors relative to a reference direction.

4. The system of claim 3, further comprising at least one electronic compass.

5. The system of claim 4, wherein the at least one electronic compass is located to determine the orientation of the at least one of the sensors.

6. The system of claim 1, wherein the progress information comprises the direction of the radio communication signal between the first footstep sensor and the second footstep sensor.

7. The system of claim 6, wherein the processor uses the direction of the radio communication signal to approximate the direction of travel of the pedestrian.

8. The system of claim 7, wherein the processor combines the distance and direction-of-travel measurements to determine a pedestrian location relative to the starting point.

9. The system of claim 1, wherein the processor is resident in a mobile station in radio communication with at least one of the sensors.

10. A method for determining the progress of a pedestrian from a starting location, said method comprising the steps of:
    providing a first step sensor proximate to one foot of the pedestrian;
    providing a second step sensor proximate to the other foot of the pedestrian; the second step sensor for radio communication with the first sensor via a short-range radio link, wherein the sensors are operable according to a short-range radio protocol providing for mutual radio-link length determination;
    detecting that a footstep has been taken;
    analyzing, upon detecting that a footstep has been taken, radio signals transmitted between the first step sensor and the second step sensor to mutually determine the distance between them;
    recording the determined distance in a memory device; and
    repeating the detecting, analyzing, and recording steps until the pedestrian has reached an ending location, wherein the recording step includes calculating a cumulative distance and recording at least the cumulative distance.

11. The method of claim 10, further comprising the step of providing a mobile station in communication with at least one of the sensors, the mobile station for receiving determined distances from the at least one sensor.

12. The method of claim 11, wherein the mobile station includes the memory in which the determined distances are stored.

13. The method of claim 11, wherein the cumulative distance calculation is performed in the mobile station.

14. The method of claim 11, wherein the mobile station is capable of communicating with a communications network to access a remote server.

15. The method of claim 14, further comprising the step of transmitting progress information from the mobile station to the remote server through the network.

16. The method of claim 10, further comprising the step of providing a directional indicator for indicating the direction of orientation of at least one of the sensors relative to a reference orientation.

17. The method of claim 16, wherein the direction indicator is a compass.

18. The method of claim 16, further comprising the step of measuring, upon detecting that a footstep has been taken, the orientation of at least one of the sensors relative to a reference direction.

19. The method of claim 10, further comprising the step of determining, upon detecting that a footstep has been taken, the relative orientation of the first sensor and the second sensor.

20. The method of claim 19, further comprising the step of using the relative orientation to determine a direction of travel.

21. The method of claim 20, further comprising the step of using the measured distance and the relative orientation to determine the location of the pedestrian relative to the starting location.

22. The method of claim 21, further comprising the step of repeatedly determining the location of the pedestrian as subsequent footsteps are detected.

23. The method of claim 21, further comprising the step of storing multiple distance measurements and relative orientation such that the position of the pedestrian after a certain footstep relative to the starting location may be calculated.

* * * * *